United States Patent
Nagaishi et al.

(10) Patent No.: US 9,323,062 B2
(45) Date of Patent: Apr. 26, 2016

(54) SPLIT UNIT

(71) Applicant: Panasonic Intellectual Property Management Co., Ltd., Osaka (JP)

(72) Inventors: Yuji Nagaishi, Osaka (JP); Hiroaki Shimazaki, Tokyo (JP); Kenjiro Tsuda, Kyoto (JP); Takashi Masuno, Osaka (JP); Osamu Kajino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/571,750

(22) Filed: Dec. 16, 2014

(65) Prior Publication Data

US 2015/0098132 A1   Apr. 9, 2015

Related U.S. Application Data

(63) Continuation of application No. PCT/JP2013/003514, filed on Jun. 4, 2013.

(30) Foreign Application Priority Data

Jun. 18, 2012   (JP) ................................ 2012-136595

(51) Int. Cl.
*G02B 27/10* (2006.01)
*G02B 5/04* (2006.01)
(Continued)

(52) U.S. Cl.
CPC .............. *G02B 27/1013* (2013.01); *G02B 5/04* (2013.01); *G02B 27/14* (2013.01); *G02B 27/22* (2013.01);
(Continued)

(58) Field of Classification Search
CPC .... G02B 27/1013; G02B 27/22; G02B 27/10; G02B 27/106; G02B 27/2228; G02B 27/22235; G02B 27/24; G03B 35/10; G03B 35/08
See application file for complete search history.

(56) References Cited

U.S. PATENT DOCUMENTS

| 5,386,228 A | 1/1995 | Okino |
| 2004/0212748 A1 | 10/2004 | Suzuki et al. |

(Continued)

FOREIGN PATENT DOCUMENTS

| JP | 02-079582 A | 3/1990 |
| JP | 05-064044 A | 3/1993 |

(Continued)

OTHER PUBLICATIONS

International Search Report for corresponding International Application No. PCT/JP2013/003514 mailed Jul. 9, 2013.

(Continued)

*Primary Examiner* — Joseph P Martinez
(74) *Attorney, Agent, or Firm* — Renner, Otto, Boisselle & Sklar, LLP

(57) ABSTRACT

A split unit capable of providing a stereoscopic image having less laterality is provided. The split unit includes: a beam splitter which transmits first imaging light as a part of light incident on an incident surface of the beam splitter, and reflects second imaging light as another part of the light incident on the incident surface; and a reflecting member which reflects the second imaging light reflected by the beam splitter. At least one of a reflectance of the reflecting member and a beam splitting characteristic of the beam splitter is set based on the following formulae:

$T = d/(1+d)$ $R = 1 - T$ where
T ($0 \leq T \leq 1$) is a transmittance of the beam splitter,
R ($0 \leq R \leq 1$) is a reflectance of the beam splitter, and
d ($0 \leq d \leq 1$) is a reflectance of the reflecting member.

5 Claims, 4 Drawing Sheets

(51) Int. Cl.
*G03B 35/08* (2006.01)
*G02B 27/22* (2006.01)
*H04N 13/02* (2006.01)
*G02B 27/14* (2006.01)
*G03B 35/10* (2006.01)

(52) U.S. Cl.
CPC ............... *G03B 35/08* (2013.01); *G03B 35/10* (2013.01); *H04N 13/0214* (2013.01); *H04N 13/0239* (2013.01)

(56) References Cited

U.S. PATENT DOCUMENTS

| | | |
|---|---|---|
| 2010/0109980 A1 | 5/2010 | Tohara et al. |
| 2011/0199547 A1 | 8/2011 | Hayashi et al. |
| 2014/0193144 A1* | 7/2014 | Coster .................. F16M 11/045 396/325 |

FOREIGN PATENT DOCUMENTS

| | | |
|---|---|---|
| JP | 07-221924 A | 8/1995 |
| JP | 09-113846 A | 5/1997 |
| JP | 2004-309751 A | 11/2004 |
| JP | 2004-312545 A | 11/2004 |
| JP | 2007-318307 A | 12/2007 |
| JP | 2010-107874 A | 5/2010 |
| WO | WO 2011/033694 A1 | 3/2011 |

OTHER PUBLICATIONS

Form PCT/ISA/237 for corresponding International Application No. PCT/JP2013/003514 dated Jul. 9, 2013.

* cited by examiner

SPLIT UNIT

CROSS-REFERENCE TO RELATED APPLICATION

This application is a Continuation of International Application No. PCT/JP2013/003514, filed on Jun. 4, 2013, which claims priority of Japanese Application No. 2012-136595, filed on Jun. 18, 2012, the disclosures of which Applications are incorporated by reference herein.

BACKGROUND

1. Field

The present disclosure relates to a member that splits light from a subject when a stereoscopic image is captured.

2. Description of the Related Art

Japanese Laid-Open Patent Publication No. 2007-318307 discloses an image processing apparatus that obtains image data for displaying a three-dimensional image. This image processing apparatus includes a half mirror 101$d$, a first reflecting mirror 101$e$, a second reflecting mirror 101$f$, and a third reflecting mirror 101$h$. Thereby, incident light from a subject is split to be incident on a first CCD 101$g$ and a second CCD 101$j$, respectively.

SUMMARY

The present disclosure provides a split unit capable of generating a stereoscopic image having less laterality.

A split unit according to the present disclosure includes: a beam splitter which transmits first imaging light as a part of light incident from an incident surface of the beam splitter, and reflects second imaging light as another part of the light incident from the incident surface; and a reflecting member which reflects the second imaging light reflected by the beam splitter. At least one of a reflectance of the reflecting member and a beam splitting ratio of the beam splitter is set based on the following formulae:

$$T = d/(1+d)$$

$$R = 1 - T$$

where
T ($0 \leq T \leq 1$) is a transmittance of the beam splitter,
R ($0 \leq R \leq 1$) is a reflectance of the beam splitter, and
d ($0 \leq d \leq 1$) is a reflectance of the reflecting member.

The split unit according to the present disclosure can generate an image having less laterality as compared to the conventional split unit.

DETAILED DESCRIPTION

Hereinafter, embodiments will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art.

It is noted that the inventors provide the accompanying drawings and the following description in order a person skilled in art to fully understand the present disclosure, and do not intend to limit the subject matter defined by the claims.

Embodiment 1

Hereinafter, Embodiment 1 will be described with reference to FIGS. 1 to 4.

Figure 1:
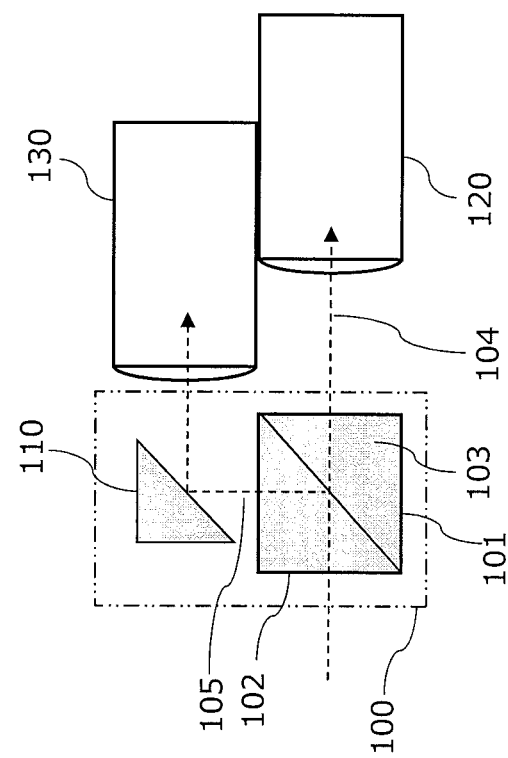
FIG. 1 is a diagram illustrating an image capturing system.

FIG. 1 is a diagram illustrating an image capturing system.

The image capturing system includes a prism unit 100, a first imaging device 120, and a second imaging device 130.

The prism unit 100 splits light from a subject to generate first imaging light 104 and second imaging light 105.

The first imaging device 120 generates a first viewpoint image among images constituting a stereoscopic image, based on the first imaging light 104 obtained by the beam splitting by the prism unit 100.

The second imaging device 130 generates a second viewpoint image among the images constituting the stereoscopic image, based on the second imaging light 105 obtained by the beam splitting by the prism unit 100.

Hereinafter, the specific configuration of the prism unit 100 will be described.

The prism unit 100 includes a prism 101 and a reflecting mirror 110.

The prism 101 is a rectangular parallelepiped member formed of a resin material that transmits light. The prism 101 splits subject light entering an incident surface 102 at a beam splitter surface 103, and emits the first imaging light 104 and the second imaging light 105. Specifically, the beam splitter surface 103 transmits the first imaging light 104 as a part of the light reflected from the subject, and reflects the second imaging light 105 as another part of the light reflected from the subject. In the prism 101, the beam splitter surface 103 is formed so as to have an angle of almost 45 degrees with respect to the incident surface 102. The beam splitting characteristic of the beam splitter surface 103 depends on at least the reflection characteristic of the reflecting mirror 110. A specific method of setting the beam splitting characteristic of the beam splitter surface 103 will be described later.

It is noted that the material of the prism 101 is not limited to the resin material described above, and a glass material may be used. In other words, any member may be used as long as it has a rectangular parallelepiped body and a beam splitter surface.

The reflecting mirror 110 again reflects the light reflected at the beam splitter surface 103 of the prism 101. The reflection characteristic of the reflecting mirror 110 depends on at least the beam splitting characteristic at the beam splitter surface 103. A specific method of setting the reflection characteristic of the reflecting mirror 110 will be described later.

(Specific Method of Setting the Characteristics of Prism 101 and Reflecting Mirror 110)

At least one of the reflection characteristic of the reflecting mirror 110 and the beam splitting ratio at the beam splitter surface 103 is set such that the amount of the second imaging light 105 reflected by the reflecting mirror 110 and the amount of the first imaging light 104 transmitted through the prism 101 are substantially equal to each other.

A method of setting the beam splitting characteristic of the beam splitter surface 103 in the case where the reflection characteristic of the reflecting mirror 110 has already been determined, will be described with reference to the drawings.

Figure 2:
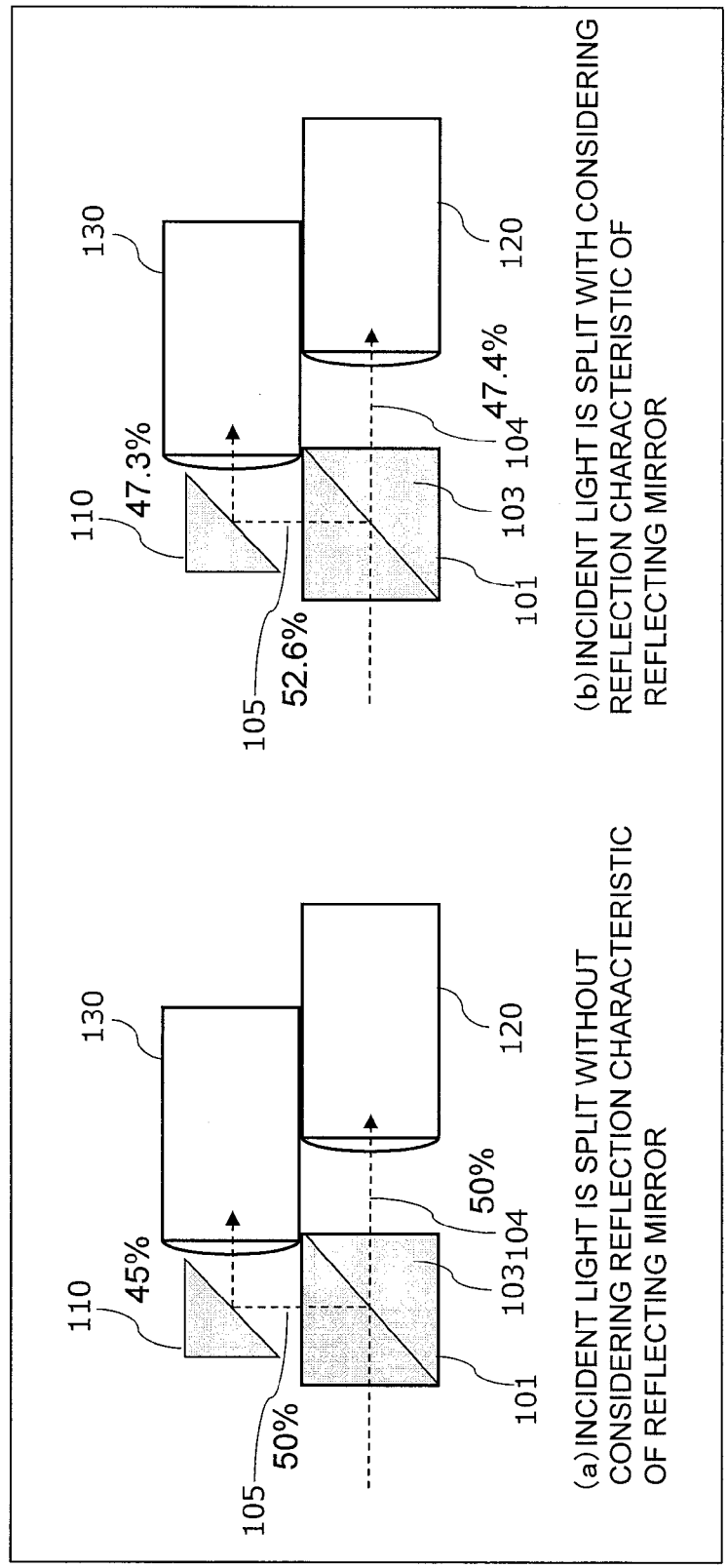
FIG. 2 is a diagram for explaining the function when the characteristic of a reflecting mirror is considered.

FIG. 2 is a diagram for explaining the function when the characteristic of the reflecting mirror 110 is considered. FIG. 2(a) shows a split unit according to a comparison example, and FIG. 2(b) shows the split unit according to the present disclosure.

Now, a case is assumed in which the reflecting mirror 110 shown in FIG. 2 has such a spectroscopic characteristic that the amount of the second imaging light 105 is reduced to 90% when the second imaging light 105 is reflected by the reflecting mirror 110.

When the reflecting mirror has the above reflection characteristic, if the beam splitting ratio at the beam splitter surface 103 is set at 50:50, i.e., such that 50% of the light from the subject is transmitted while 50% thereof is reflected, 50% of the light from the subject enters the first imaging device 120 as shown in FIG. 2(a). On the other hand, since the light reflected at the beam splitter surface 103 is reduced to 90% as the result of the reflection by the reflecting mirror 110, 45% of the light from the subject enters the second imaging device 130. That is, if the beam splitting characteristic of the beam splitter surface 103 is set without considering the reflection characteristic of the reflecting mirror 110, a difference in brightness occurs between the first viewpoint image obtained by the first imaging device 120 and the second viewpoint image obtained by the second imaging device 130. Such a difference in brightness between the first viewpoint image and the second viewpoint image may make the viewer feel discomfort when the stereoscopic image is reproduced.

On the other hand, in the split unit according to the present disclosure, although the reflecting mirror 110 of the same reflection characteristic as that of the comparison example shown in FIG. 2(a) is used, the beam splitting ratio at the beam splitter surface 103 is set at 47.4:52.6, i.e., such that 47.4% of the light from the subject is transmitted while 52.6% thereof is reflected, as shown in FIG. 2(b). In this case, the first imaging light 104 obtained after the light reflected at the beam splitter surface 103 is again reflected by the reflecting mirror 110 is 47.4% of the light from the subject, while the second imaging light 105 transmitted through the beam splitter surface 103 is 47.3% of the light from the subject. That is, a difference in amount between the first imaging light 104 and the second imaging light 105 is decreased, and a difference in brightness between the first viewpoint image obtained by the first imaging device 120 and the second viewpoint image obtained by the second imaging device 130 is also decreased. Thereby, it is possible to reduce discomfort that the user may feel when viewing the stereoscopic video.

When the transmittance of the beam splitter surface 103 is T (0>T≤1), the reflectance thereof is R (0≤R≤1), and the reflectance of the reflecting mirror 110 is d (0≤d≤1), the beam splitting characteristic of the beam splitter surface 103 is determined by the following formulae:

$$T = d/(1+d) \quad \text{(Formula 1)}$$

$$R = 1 - T \quad \text{(Formula 2)}$$

The above description has been made for the case where the reflection characteristic of the reflecting mirror 110 has been determined in advance. However, if the beam splitting characteristic of the beam splitter surface 103 has been determined in advance, the reflection coefficient of the reflecting mirror 110 can also be appropriately set by using the above formulae.

The values obtained from the above formulae are merely indexes, and therefore, the exact values obtained from the formulae may not be used. That is, values close to the values obtained from the formulae may be used to achieve the same effect of the present embodiment.

The beam splitting characteristic of the prism 101 varies depending on the incident angle of light on the prism 101, and deflection components of the light. Therefore, the beam splitting characteristic of the prism 101 is desired to be set in consideration of the incident angle and the deflection components.

Figure 3:
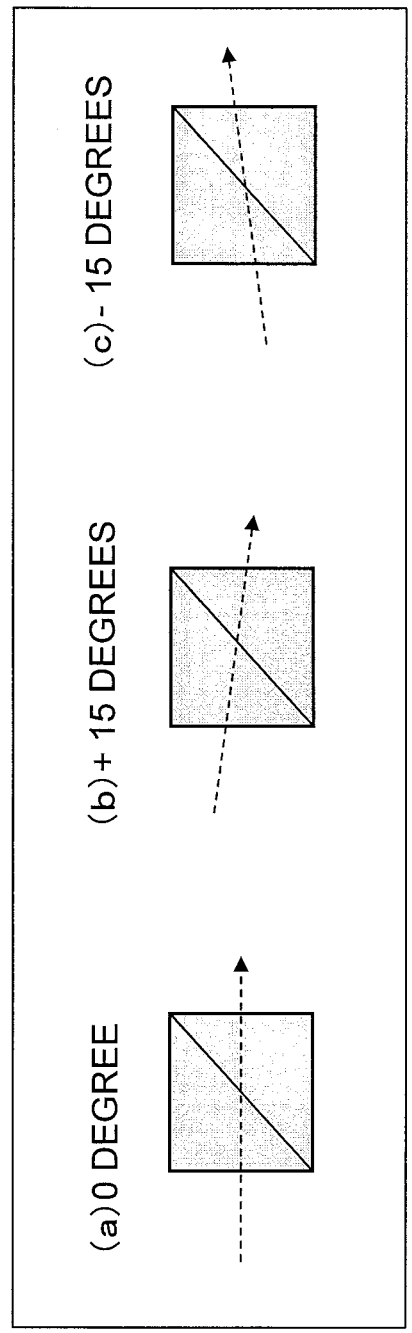
FIG. 3 is a diagram for explaining incident angles of light on a prism.
Figure 4:
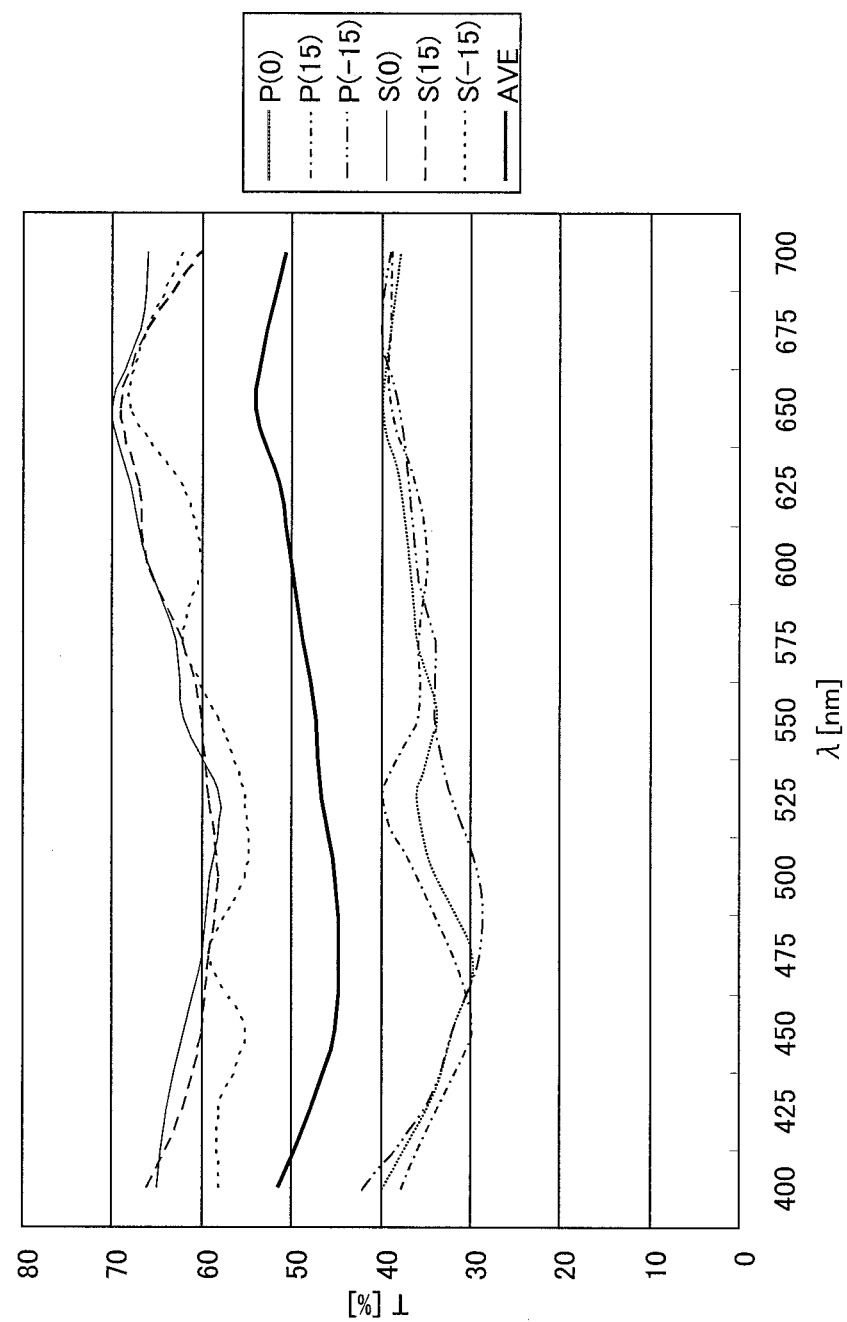
FIG. 4 is a diagram illustrating the relationship between incident angles of P-polarized light and S-polarized light on the prism and transmittance of the prism.

FIG. 3 is a diagram for explaining the incident angle of light on the prism 101. FIG. 4 is a diagram illustrating the relationship between the incident angle of P-polarized light or S-polarized light on the prism and the transmittance of the prism. In the following description, as the incident angle on the prism 101, 0 degree and ±15 degrees are considered. The incident angle means an angle that the incident light forms with respect to a straight line perpendicular to the incident surface of the prism 101, and the incident angle of light that is incident in the direction perpendicular to the incident surface of the prism 101 is 0 degree. The sign of the incident angle is determined such that the angle of light incident on the incident surface diagonally from above is positive, and the angle of light incident on the incident surface diagonally from below is negative. In addition, in FIG. 4, P(X) indicates P-polarized light having an incident angle of X degree, S(X) indicates S-polarized light having an incident angle of X degree, and AVE indicates the average of the transmittances of six types of light beams shown in FIG. 4.

The beam splitting characteristic of the prism 101, as shown in FIG. 4, varies depending on the incident angle on the prism 101 and the polarization method. In the example of FIG. 4, the transmittance of the S-polarized light is relatively higher than the transmittance of the P-polarized light. In addition, even the light beams of the same polarization component have different transmittances depending on the incident angles thereof. According to the above formulae, one of the reflectance of the mirror 110 and the beam splitting ratio at the beam splitter surface 103 is set depending on the other, whereby the amount of the light reflected by the mirror 110 and the amount of the light transmitted through the beam splitter surface 103 are made equal to each other. In addition, preferably, the beam splitting characteristic of the prism 101 is set based on the average of at least two incident states. Thereby, the beam splitting characteristic of the prism 101 can be set in consideration of various states, although it is not optimized for one state.

Specifically, for example, when reflection occurs at a boundary surface such as a water surface in an imaging range, a difference in reflectance between P-polarized light and S-polarized light causes a difference in amount of reflected light from the boundary surface between split two light beams. Assuming such a situation, the beam splitting ratio at the beam splitter surface 103 is set based on the average of the transmittances of the P-polarized light and the S-polarized light. Thereby, even when the subject reflecting at the boundary surface is captured, a difference between the first viewpoint image obtained by the first imaging device 120 and the second viewpoint image obtained by the second imaging device 130 can be reduced. As a result, it is possible to reduce discomfort that the viewer may feel when viewing the stereoscopic image including the subject reflecting at the boundary surface.

In actual shooting scenes, the light from the subject is incident on the prism 101 not only in the direction perpendicular to the incident surface of the prism 101 (incident angle=0 degree) but also in various directions. Assuming such a situation, the beam splitting ratio at the beam splitter surface 103 is set based on the average of the transmittances of light beams having different incident angles. Thereby, even when a large amount of light of a specific incident angle component is incident on the prism 101, a difference between the first viewpoint image obtained by the first imaging device 120 and the second viewpoint image obtained by the second imaging device 130 can be reduced. As a result, it is possible to reduce discomfort that the viewer may feel when viewing the stereoscopic image captured in various shooting scenes.

The beam splitting ratio at the beam splitter surface 103 varies depending on the wavelength of the incident light. Therefore, the beam splitting ratio at the beam splitter surface 103 is set such that when light having a predetermined design center wavelength (e.g., 550 nm) is incident, the amounts of two light beams split by the prism unit 100 are substantially equal to each other, and such that when light having wavelength shorter or longer than the predetermined design center wavelength, the beam splitting ratio is within a predetermined allowable range. In the example of FIG. 4, the beam splitting ratio at the beam splitter surface 103 is set such that the transmittance of the beam splitter surface 103 in the visible region does not exceed 10%. By setting the beam splitting ratio as described above, a difference in light amount between the two split light beams can be reduced in various shooting scenes.

In addition, at least one of the reflectance of the reflecting mirror 110 and the beam splitting characteristic of the beam splitter surface 103 is set such that a difference in brightness between the first viewpoint image obtained by the first imaging device 120 and the second viewpoint image obtained by the second imaging device 130 is not smaller than 0% but not larger than 35%. Thereby, it is possible to reduce discomfort that the viewer may feel. Within this range, a difference in brightness between the first viewpoint image and the second viewpoint image being not smaller than 0% but not larger than 12% is more effective for reduction of discomfort that the viewer may feel.

In the example of FIG. 4, the beam splitting characteristic of the prism 101 is set based on the average of the transmittances of the P-polarized light beams having different incident angles and the S-polarized light beams having different incident angles. However, the beam splitting characteristic of the prism 101 may be set, without considering the incident angles, based on the average of the transmittances of P-polarized light and S-polarized light each having a predetermined incident angle. Alternatively, the beam splitting characteristic of the prism 101 may be set, without considering the polarization components, based on the average of the transmittances of multiple types of light beams having different incident angles.

In the present embodiment, the beam splitting characteristic of the prism 101 is optimized in consideration of various shooting modes. However, if a shooting mode using the prism unit 100 has been determined in advance, the beam splitting characteristic of the prism 101 may be set in consideration of only the shooting mode.

As described above, in the present embodiment, the prism unit 100 includes the prism 101 which transmits the first imaging light 104 as a part of the light reflected from the subject, and reflects the second imaging light 105 as another part of the light reflected from the subject, and the reflecting mirror 110 which reflects the reflected second imaging light 105. At least one of the reflectance of the reflecting mirror 110 and the beam splitting characteristic of the prism 101 is set such that the brightness of the second imaging light 105 reflected by the reflecting mirror 110 and the brightness of the first imaging light 104 transmitted through the prism are substantially equal to each other.

Thereby, the amount of the first imaging light 104 and the amount of the second imaging light 105 can be made substantially equal to each other. Therefore, when the first viewpoint image obtained by capturing the first imaging light 104 and the second viewpoint image obtained by capturing the second imaging light 105 are viewed as a stereoscopic image, a difference in brightness is reduced, and thus discomfort that the user may feel can be reduced.

Further, in the present embodiment, when the transmittance of the prism 101 is T ($0 \leq T \leq 1$), the reflectance of the prism 101 is R ($0 \leq R \leq 1$), and the reflectance of the reflecting mirror 110 is d ($0 \leq d \leq 1$), T=d/(1+d) and R=1−T are satisfied.

Thereby, the beam splitting characteristic and the reflection characteristic can be mathematically set. Therefore, manufacturers can easily set the characteristics of the prism 101 and the reflecting mirror 110.

Further, in the present embodiment, the beam splitting ratio of the prism 101 is calculated from the average of the transmittances of P-polarized light and S-polarized light which are measured at at least one or more incident angles.

Thereby, it is possible to design the prism unit 100 adaptive to various shooting modes or conditions.

Other Embodiments

As described above, the embodiment has been descried as an example of implementation of the present disclosure. However, the present disclosure is not limited to the embodiment, and is also applicable to other embodiments realized by modifications, replacements, additions, omissions, or the like as appropriate. Furthermore, another embodiment can be implemented by combining the components described above for the embodiment.

Hereinafter, other embodiments will be described together.

In the above embodiment, the prism 101 has been described as an example of a beam splitter. When the prism 101 is used as the beam splitter, the size of the entire image capturing device can be reduced. However, the beam splitter is not limited to the prism 101. For example, a semi-reflective mirror may be used as the beam splitter. When the semi-reflective mirror is used as the beam splitter, the beam splitting characteristic can be easily adjusted because the beam splitter surface 103 is not covered with a resin material. In short, any member may be used as the beam splitter as long as the member transmits the first imaging light as a part of light reflected from a subject, and reflects the second imaging light as another part of the light reflected from the subject.

The present disclosure is applicable to a splitter unit which can make the brightness of the first imaging light 104 and the brightness of the second imaging light 105 substantially equal to each other. Specifically, the present disclosure is applicable to a camera or the like for capturing a general stereoscopic image.

What is claimed is:
1. A split unit comprising:
   a beam splitter which transmits first imaging light as a part of light incident on an incident surface of the beam splitter, and reflects second imaging light as another part of the light incident on the incident surface; and
   a reflecting member which reflects the second imaging light reflected by the beam splitter, wherein
   at least one of a reflectance of the reflecting member and a beam splitting characteristic of the beam splitter is set based on the following formulae:

$$T = d/(1+d)$$

$$R = 1-T$$

where
T (0≤T≤1) is a transmittance of the beam splitter,
R (0≤R≤1) is a reflectance of the beam splitter, and
d (0≤d≤1) is a reflectance of the reflecting member.

2. The split unit according to claim 1, wherein a beam splitting ratio of the beam splitter is set such that when light having a predetermined design center wavelength is incident on the beam splitter, the amount of the second imaging light reflected by the reflecting member and the amount of the first imaging light transmitted through the prism are substantially equal to each other, and when light having a wavelength in a visible region other than the design center wavelength is incident on the beam splitter, the beam splitting ratio is within a predetermined allowable range.

3. The split unit according to claim 1, wherein at least one of the reflectance of the reflecting member and the beam splitting characteristic of the beam splitter is set such that a difference between brightness of an image formed by the second imaging light reflected by the reflecting member and brightness of an image formed by the first imaging light transmitted through the prism is not smaller than 0% but not larger than 35%.

4. The split unit according to claim 1, wherein the beam splitting ratio of the beam splitter is set based on the average of transmittances of P-polarized light and S-polarized light.

5. The split unit according to claim 4, wherein the beam splitting ratio of the beam splitter is set based on the average of transmittances of P-polarized light beams having a plurality of incident angles and S-polarized light beams having a plurality of incident angles.

* * * * *